United States Patent [19]

Moan

[11] Patent Number: 4,836,049
[45] Date of Patent: Jun. 6, 1989

[54] CONTINUALLY VARIABLE TRANSMISSION HAVING FIXED RATIO AND VARIABLE RATIO MECHANISMS

[75] Inventor: Richard D. Moan, Livonia, Mich.

[73] Assignee: Ford Motor Company, Dearborn, Mich.

[21] Appl. No.: 129,264

[22] Filed: Dec. 7, 1987

[51] Int. Cl.[4] .................. F16H 37/00; F16H 37/08
[52] U.S. Cl. .................................. 74/689; 74/688; 74/718; 74/701
[58] Field of Search ............... 74/689, 740, 701, 688, 74/681, 718

[56] References Cited

U.S. PATENT DOCUMENTS

| | | | |
|---|---|---|---|
| 4,224,837 | 9/1980 | Croswhite | 74/688 |
| 4,290,320 | 9/1981 | Abbott | 74/689 |
| 4,331,044 | 5/1982 | Bookout et al. | 74/688 |
| 4,346,622 | 8/1982 | Pierce | 74/688 |
| 4,402,237 | 9/1983 | Tomlinson | 74/689 |
| 4,553,450 | 11/1985 | Gizard | 74/689 |
| 4,589,303 | 5/1986 | Roberts | 74/689 |
| 4,644,820 | 2/1987 | Macey et al. | 74/689 |

Primary Examiner—Dirk Wright
Attorney, Agent, or Firm—Frank G. McKenzie; Donald J. Harrington

[57] ABSTRACT

A continually variable transmission includes a fluid coupling having an impeller driven from a power source and connected to the input sheave of a fixed speed ratio change drive mechanism, and an impeller connected to the input sheave of a variable speed ratio belt drive mechanism. A coupling bypass clutch mechanically connects the impeller and the turbine. A compound planetary gear set has its sun gear driven from the output sheave of the variable drive mechanism and its ring gear connected to the output sheave of the fixed ratio mechanism, which is mounted on a one-way clutch and selectively drives the ring gear through a low mode clutch. One planet pinion set is continuously engaged with the ring gear, a second planet pinion set is continuously engaged with the first planet pinion set and with the ring gear. A pinion carrier rotatably supports both pinion sets and its connectable through a high mode clutch to the output of the variable belt mechanism. A final drive gear set connects the carrier to a differential mechanism through speed reduction gearing. One of the components of the high mode clutch may be mounted on a one-way clutch. A hill retard clutch selectively connects the carrier to the output of the variable drive mechanism.

29 Claims, 1 Drawing Sheet

CONTINUALLY VARIABLE TRANSMISSION HAVING FIXED RATIO AND VARIABLE RATIO MECHANISMS

BACKGROUND OF THE INVENTION

1. Field of the Invention

This invention relates to the field of continually variable transmissions that produce stepless speed ratio changes. More particularly, the invention pertains to such transmissions having a fixed speed ratio mechanism and a variable speed ratio mechanism.

2. Description of the Prior Art

Automatic transmissions for automotive use that employ a belt drive variable speed ratio mechanism usually include a torque converter located in the driveline between the power source and a variable drive mechanism, or between a forward and reverse drive gear set and the variable drive mechanism. At the lower speed ratios, the torque converter produces torque multiplication to assist in accelerating the vehicle from rest. At higher speed ratios, the torque converter is locked up to produce a mechanical connection between its input and output rather than the conventional hydrodynamic connection to avoid the losses inherent in the operation of a torque converter. At the higher speed ratios, the belt drive mechanism alone produces the torque multiplication and speed reduction between the power source and drive wheels.

It is preferred that the added expense of a torque converter and the inherent high dynamic losses associated with its operation be avoided in a continually variable transmission by using in place of the torque converter a simple fluid coupling having the capacity to attenuate driveline vibrations and harshness. However, an inherent disadvantage in merely substituting a fluid coupling for a torque converter is the loss of torque multiplication with the torque converter.

A compound planetary gear set can be operated in a regeneration mode to produce torque multiplication at lower speed ratios when its sun gear and ring gear are driven and a planet carrier is used as the output of the gear set. A compound planetary gear set can be operated in a geared neutral condition if the speed of the sun gear is increased in relation to the speed of its ring gear so that the overall speed ratio of the gear set is lowered from the speed ratio that results when the ring gear and sun gear are driven at the same speed. Still further increases of the speed of the sun gear in relation to the speed of the ring gear will produce a speed ratio that passes through zero and becomes negative when the relative speed of the sun gear increases further yet. The gearset has been operated in this manner to Produce reverse drive and forward drive. However, in certain conditions near the zero speed ratio condition, the torques carried by the mechanisms that drive the gearset inputs can rise to enormous levels, in excess of their ability to carry the load.

SUMMARY OF TH INVENTION

A continually variable transmission according to this invention includes a fluid coupling having an impeller driven from the power source and connected to the input sheave of a fixed speed ratio change drive mechanism and an impeller connected to the input sheave of a variable speed ratio belt drive mechanism. A coupling bypass clutch mechanically connects and disconnects the impeller and the turbine. A compound planetary gear set has its sun gear driven from the output sheave of the variable drive mechanism and its ring gear connected to the output sheave of the fixed ratio mechanism, which is mounted on a one-way clutch and selectively drives the ring gear through a low mode clutch. One planet pinion set is continuously engaged with the ring gear, a second planet pinion set is continuously engaged with the first planet pinion set and with the ring gear. A pinion carrier rotatably supports both planet pinion sets and is connectable through a high mode clutch to the output of the variable belt mechanism. A final drive gear set connects the carrier to a differential mechanism through speed reduction gearing. One of the components of the high mode clutch may be mounted on a one-way clutch. A hill retard clutch selectively connects the carrier to the output of the variable drive mechanism.

The fixed speed ratio change drive mechanism has substantially the same speed ratio as th maximum underdrive belt ratio. With this arrangement, when the belt is shifted toward overdrive, the sun gear speed is increased and the overall transmission ratio moves deeper into overdrive. When the speed of the sun gear and ring gear are substantially equal, an upshift occurs by engaging the high gear clutch, thereby locking the compound planetary gear set. Thereafter, gear ratio changes are produced by altering the radii on the input and output sheaves of the variable speed ratios belt drive mechanisms in accordance with the demands of the vehicle driver.

DESCRIPTION OF THE PREFERRED EMBODIMENT

Figure 1:
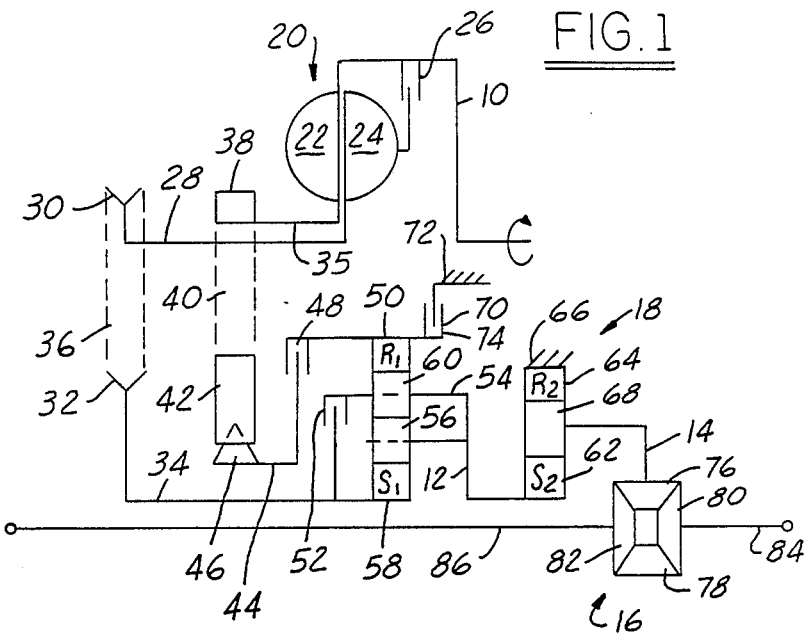
FIG. 1 is a schematic diagram of a continually variable automotive transmission according to this invention.

Referring first to FIG. 1, a transmission according to this invention includes an input 10 drivably connected to a power source, and an output 12, which is either directly connected to the spindle 14 of a differential mechanism 16 or to a final drive gear set 18.

A fluid coupling 20 has an impeller 22 hydrodynamically connected to a turbine 24. A fluid coupling bypass clutch 26 is engaged to mechanically connect the turbine and impeller and is disengaged so that the connection between the impeller and the turbine is entirely hydrodynamic. The turbine rotates on a shaft 28, which supports the input sheave 30 of a belt drive mechanism whose output sheave 32 is rotatably supported on shaft 34. The belt drive mechanism produces a variable ratio of the speed of shaft 34 to shaft 28 by selectively varying the radii on sheaves 30 and 32 where an endless flexible belt 36 engages the sheaves. For example, when shaft 34 is underdriven, belt 36 engages sheave 30 at a relatively small radius and engages sheave 32 at a relatively large radius. When shaft 34 is overdriven, the belt engages sheave 30 at a large radius and engages sheave 32 at a relatively small radius.

The impeller of the fluid coupling is rotatably supported on shaft 35, which supports the input sheave 38 of a second drive mechanism, which includes a chain 40 drivably connecting sheave 38 and sheave 42, which is supported rotatably on shaft 44. A one-way clutch 46 may be mounted on shaft 44 so that sheave 42 is carried on the one-way clutch, or clutch 46 may be located on shaft 35 so that sheave 38 is supported on the one-way clutch.

A low speed ratio clutch 48 is located in the driveline between shaft 44 and ring gear 50. When clutch 48 is engaged, it drivably disconnects the ring gear and shaft 44. A high speed ratio clutch 52 drivably connects shaft 34 and a carrier 54, on which are rotatably supported a first set of planet pinions 56, continuously engaged with a sun gear 58, and a second set of planet pinions 60, continuously in mesh with the first planet pinion set and with ring gear 50.

The final drive gearset 18 includes a sun gear 62, a ring gear 64 fixed on the transmission casing at 66 to prevent its rotation, and a set of planet pinions 68 in mesh with the sun gear 62 and ring gear 64. The output gear set, instead of being a planetary gear set, may comprise two meshing gears, the first of these driven by the transmission output 12 and the second drivably connected to the spindle 14 of the differential mechanism 16.

A reverse brake 70 has one member fixed to the transmission casing at 72 and a second member 74 drivably connected to ring gear 50. When brake 70 is applied, the ring gear is held against rotation on the transmission casing.

The differential mechanism 16 includes bevel pinions 76, 78, rotatably supported on spindle 14, and side bevel gears 80, 82, rotatably supported on axle shafts 84, 86, which are drivably connected to the drive wheels of the vehicle and are in continuous meshing engagement with the bevel pinions.

The second drive mechanism produces a constant ratio of the speeds of the shaft 44 and shaft 35, whereas the first drive mechanism produces a variable range of ratios, shaft 34 to shaft 28. Preferably, the maximum underdrive ratio produced by the first drive mechanism is substantially equal to the constant drive ratio of the second drive mechanism.

Figure 2:
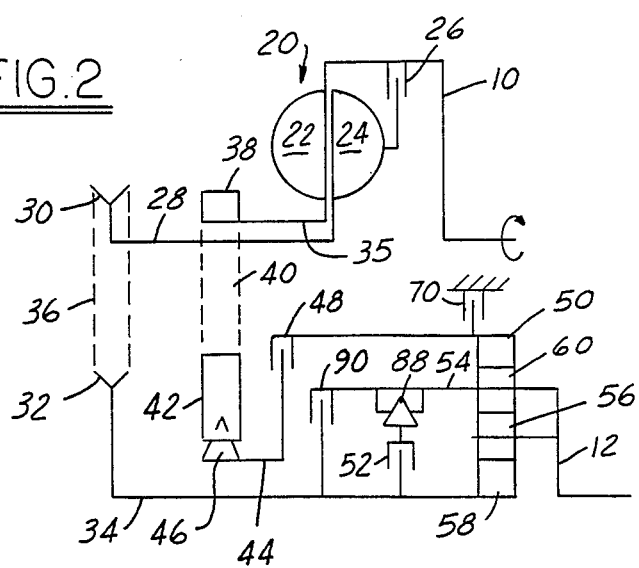
FIG. 2 is a schematic diagram of an alternate form of the transmission of FIG. 1.

FIG. 2 shows a second embodiment in which each of the components discussed with respect to FIG. 1 has the same identifying number as in that figure. In FIG. 2, the high speed clutch 52 has a one-way clutch 88 located in the driveline between shaft 34 and carrier 54. The one-way clutch may be located either between clutch 52 and carrier 54 or between clutch 52 and shaft 34. A hill retard clutch 90 drivably connects shaft 34 and carrier 54 when the clutch is engaged, and disconnects these components when the clutch is disengaged.

The sun gear 58 of the compound planetary gear set is driven through the fluid coupling and the variable ratio belt drive mechanism. The ring gear of the compound planetary gear set is driven through fixed speed ratio drive mechanism, one-way clutch 46 and low clutch 48. The vehicle driven through this transmission is accelerated from rest when low clutch 48 is engaged, bypass clutch 26, high clutch 52 and reverse brake 70 are disengaged and the variable belt drive is set substantially at the lowest speed ratio it can produce, the maximum underdrive position. When this condition exists, the speed of carrier 54, ring gear 50 and sun gear 58 are equal. The speed of the transmission output is the same as that of the chain drive and belt drive mechanisms. However, a lower transmission drive ratio is produced if the output speed of the variable belt drive mechanism is increased by moving sheaves 30 and 32 toward their overdrive positions. For example, if the ratio of the diameter of ring gear 50 to that of sun gear 58 is 3.0 and the output speed of shaft 34 is increased by 50% over its speed when the belt mechanism is set at the minimum underdrive position, then the transmission drive ratio is reduced from 1.0 to 0.75. If the speed of shaft 34 is increased to three times its speed when belt mechanism is set at the minimum underdrive position, then the transmission drive ratio approaches zero. If the belt drive mechanism is moved further toward the overdrive position such that the speed of shaft 34 is increased to greater than three times its minimum underdrive speed, then the transmission drive ratio becomes negative, and decreases with further increases in the speed of shaft 34.

It is, however, not the intention to operate the transmission by employing the geared neutral feature nor to obtain reverse drive in this way because of the high torque loads imposed on the components of the transmission. Instead, the transmission will be operated to extend the range of the overall transmission drive ratio to lower drive ratios than the ratio that results when the belt mechanism is operating at its maximum underdrive position, and the speeds of the sun gear, ring gear and carrier are equal.

First the vehicle is accelerated from rest according to the starting mode described above, wherein the speed of the output of the belt drive mechanism is higher than the output speed of the chain drive mechanism; e.g., 60 percent higher. Then the output speed of the belt mechanism is reduced toward the output speed of the chain drive mechanism. This increases the drive ratio of the transmission from about 0.70 to 1.0. When the outputs of the belt drive and chain drive mechanisms are substantially equal, the speed of ring gear 50, sun gear 58, and clutches 48 and 52 are synchronous. At that point, the transmission is shifted to the high mode by engaging high clutch 52. High clutch 52 is applied while low clutch 48 remains engaged. This action locks the gear set so that its output is turning at the same speed as its inputs, sun gear 58 and ring gear 50. The transmission drive ratio in the high mode varies in accordance with the speed produced by the variable speed ratio belt drive mechanism as the position of belt 36 changes on pulleys 30, 32. As the transmission moves to higher drive ratios, one-way clutch 46 overruns.

FIG. 2 shows an alternate arrangement used to shift from the low mode to the high or direct CVT mode. In this case, the output speed of the belt mechanism is increased from the maximum underdrive position until sun gear 58 rotates slightly slower than planet carrier 12. High clutch 52 is then applied with no effect because one-way clutch 88, located between carrier 12 and sun gear 58, overruns. The change to the direct drive mode is then accomplished by shifting the speed ratio of the belt mechanism further toward overdrive, which action switches the torque load from one-way clutch 46 on the fixed speed ratio change mechanism to one-way clutch 88.

In the low mode, the transmission drives the carrier through one-way clutch 46. However, if the vehicle is coasting or descending a hill unpowered, and the PRNDL gear selector is located in the L position, the transmission will not drivably connect the drive wheels to the engine because one-way clutch 46 overruns unless the hill retard clutch 90, located in the driveline between shaft 34 and output 12, is applied. When this occurs, there is a direct drivable connection between carrier 54, shaft 34, the variable ratio belt drive mechanism, shaft 28, fluid coupling 20, and input 10.

The coupling bypass clutch 26 is disengaged in the low mode and engaged in the high mode when the speed of the components of the fluid coupling reach the coupling point. This eliminates coupling slip, which would occur if clutch 26 were not engaged and the speed of the fluid coupling components were to increase, and eliminates the loss associated with continuous slip of the fluid coupling in the higher speed range.

Reverse drive results in the low mode when reverse clutch 70 is engaged, low clutch 48 is engaged, and high clutch 52 is disengaged. When this occurs, the ring gear 50 is held against rotation, the gear set is driven through the belt drive mechanism, which drives sun gear 58, and the direction of rotation of carrier 12 is reversed from its direction of rotation when clutch 70 is disengaged.

Having described my invention, what I claim and desire to secure by U.S. Letters Patent is:

1. A transmission for producing a stepless, continually variable range of ratios of the speed of its output to its input comprising:
   a fluid coupling having an impeller adapted for connection to a power source and a turbine hydrodynamically connected to the impeller;
   a planetary gearset having a ring gear, a sun gear, a first set of planet pinions meshing with the sun gear, a second set of planet pinions meshing with the first set of pinions and with the ring gear, and a pinion carrier on which the first and second sets of pinions are rotatably supported;
   first drive means drivably connecting the turbine and the sun gear for producing a variable speed ratio therebetween having a range between an underdrive ratio and an overdrive ratio;
   second drive means drivably connecting the impeller and the ring gear for producing a fixed speed ratio therebetween;
   a first clutch means for drivably connecting and disconnecting the ring gear and the second drive means; and
   a second clutch means for drivably connecting and disconnecting the first drive means and the pinion carrier.

2. The transmission of claim 1 further comprising a first brake means for holding a member of the gear set against rotation, whereby the direction of rotation of the carrier is reversed from its direction of rotation when said held member is released.

3. The transmission of claim 1 wherein the second drive means inclines a first overrunning clutch means for producing a one way drive connection between the impeller and the ring gear.

4. The transmission of claim 1 wherein the second clutch further includes an second overrunning clutch means for producing a one way driving connection between the pinion carrier and the first drive means.

5. The transmission of claim 4 further comprising a hill braking clutch located between the sun gear and the pinion carrier for connecting and disconnecting the pinion carrier and the first drive means.

6. The transmission of claim 1 further comprising a bypass clutch for mechanically connecting disconnecting the impeller and turbine of the fluid coupling.

7. The transmission of claim 1 further comprising a final drive gearset drivably connected to the planetary gearset for producing a reduction on the speed of its output relative to the speed of the planetary gearset output.

8. The transmission of claim 4 further comprising a first brake means for holding a member of the gear set against rotation, whereby the direction of rotation of the carrier is reversed from its direction of rotation when said held member is released.

9. The transmission of claim 4 wherein the second drive means includes a first overrunning clutch means for producing a one way drive connection between the impeller and the ring gear.

10. The transmission of claim 2 wherein the second drive means includes a first overrunning clutch means for producing a one way drive connection between the impeller and the ring gear.

11. The transmission of claim 10 further comprising a first brake means for holding a member of the gear set against rotation, whereby the direction of rotation of the carrier is reversed from its direction of rotation when said held member is released.

12. The transmission of claim 5 further comprising a first brake means for holding a member of the gear set against rotation, whereby the direction of rotation of the carrier is reversed from its direction of rotation when said held member is released.

13. The transmission of claim 5 wherein the second drive means includes a first overrunning clutch means for producing a one way drive connection between the impeller and the ring gear.

14. The transmission of claim 5 further comprising a first brake means for holding a member of the gear set against rotation, whereby the direction of rotation of the carrier is reversed from its direction of rotation when said held member is released.

15. The transmission of claim 6 further comprising a first brake means for holding a member of the gear set against rotation, whereby the direction of rotation of the carrier is reversed from its direction of rotation when said held member is released.

16. The transmission of claim 6 wherein the second drive means includes a first overrunnning clutch means for producing a one way drive connection between the impeller and the ring gear.

17. The transmission of claim 12 further comprising a first brake means for holding a member of the gear set against rotation, whereby the direction of rotation of the carrier is reverse from its direction of rotation when said held member is released.

18. The transmission of claim 6 wherein the second clutch further includes an second overrunning clutch means for producing a one way driving connection between the pinion carrier and the first drive means.

19. The transmission of claim 9 further comprising a bypass clutch for mechanically connecting disconnecting the impeller and turbine of the fluid coupling.

20. The transmission of claim 15 wherein the second drive means includes a first overrunning clutch means for producing a one way drive connection between the impeller and the ring gear.

21. The transmission of claim 5 further comprising a first brake means for holding a member of the gear set against rotation, whereby the direction of rotation of the carrier is reversed from its direction of rotation when said held member is released.

22. The transmission of claim 6 further comprising a hill braking clutch located between the sun gear and the pinion carrier for connecting and disconnecting the pinion carrier and the first drive means.

23. The transmission of claim 22 further comprising a first brake means for holding a member of the gear set against rotation, whereby the direction of rotation of the carrier is reversed from its direction of rotation when said held member is released.

24. The transmission of claim 22 wherein the second drive means includes a first overrunning clutch means for producing a one way drive connection between the impeller and the ring gear.

25. The transmission of claim 22 further comprising a first brake means for holding a member of the gear set against rotation, whereby the direction of rotation of the carrier is reversed from its direction of rotation when said held member is released.

26. The transmission of claim 25 further comprising a final drive gearset drivably connected to the planetary gearset for producing a reduction on the speed of its output relative to the speed of the Planetary gearset output.

27. A method for operating a transmission that produces a continually variable range of ratios of the speed of its output to its input and includes a fluid coupling having an impeller adapted for connection to a power source and a turbine hydrodynamically connected to the impeller and having a lockup clutch for connecting these mechanically, a planetary gearset having a ring gear, a sun gear, a first set of planet pinions meshing with the sun gear, a second set of planet pinions meshing with the first set of pinions and with the ring gear, and a pinion carrier on which the first and second sets of pinions are rotatably supported, a second drive means drivably connecting the impeller and the ring gear for producing a fixed speed ratio therebetween, a first drive means drivably connecting the turbine and the sun gear for producing a variable speed ratio therebetween, and clutches for alternately connecting and disconnecting the various components, comprising the steps of:

engaging the low clutch;

shifting the belt drive means to a underdrive speed ratio position;

increasing the speed ratio output of the belt drive means; and engaging the high clutch when the speed of the ring gear and sun gear are substantially the same.

28. The method of claim 27 further comprising increasing the speed of the output of the belt drive means.

29. The method of claim 27 further comprising releasing the low clutch.

* * * * *